(12) United States Patent
Vassilieva et al.

(10) Patent No.: US 8,543,006 B2
(45) Date of Patent: Sep. 24, 2013

(54) SYSTEM AND METHOD FOR REDUCING POLARIZATION DEPENDENT LOSS

(75) Inventors: Olga I Vassilieva, Plano, TX (US); Youichi Akasaka, Allen, TX (US)

(73) Assignee: Fujitsu Limited, Kawasaki-shi (JP)

( * ) Notice: Subject to any disclaimer, the term of this patent is extended or adjusted under 35 U.S.C. 154(b) by 363 days.

(21) Appl. No.: 12/879,762

(22) Filed: Sep. 10, 2010

(65) Prior Publication Data
US 2012/0063783 A1    Mar. 15, 2012

(51) Int. Cl.
*H04B 10/00* (2006.01)
*H04J 14/06* (2006.01)
*H04B 10/12* (2006.01)

(52) U.S. Cl.
USPC ........................................................ 398/158

(58) Field of Classification Search
None
See application file for complete search history.

(56) References Cited

U.S. PATENT DOCUMENTS

| | | | |
|---|---|---|---|
| 6,545,800 B1 * | 4/2003 | Wilson et al. ............... | 359/341.4 |
| 6,947,194 B2 * | 9/2005 | Matsumoto et al. ......... | 359/280 |
| 7,067,795 B1 * | 6/2006 | Yan et al. ..................... | 250/225 |
| 7,206,517 B1 * | 4/2007 | Yu et al. ...................... | 398/152 |
| 7,519,295 B2 * | 4/2009 | Vaa et al. ..................... | 398/81 |
| 7,796,894 B1 * | 9/2010 | Yao ............................... | 398/159 |
| 2003/0156776 A1 * | 8/2003 | Han et al. ..................... | 385/11 |
| 2004/0004755 A1 * | 1/2004 | Roberts et al. ............... | 359/337 |
| 2005/0226632 A1 * | 10/2005 | Alleston et al. .............. | 398/152 |
| 2008/0170639 A1 * | 7/2008 | Vassilieva et al. ........... | 375/300 |
| 2010/0150555 A1 * | 6/2010 | Wang et al. .................. | 398/65 |
| 2010/0189438 A1 * | 7/2010 | Hoshida ........................ | 398/65 |

OTHER PUBLICATIONS

Agilent Technologies; "Agilent 8169A Polarization Controller"; Technical Specifications; pp. 6, Dec. 2004.
OZ Optics; "Electrically Driven Polarization Controller-Scrambler"; www.ozoptics.com; pp. 4, Mar. 19, 2010.
Yan et al.; "Demonstration of In-line Monitoring and Compensation of Polarization-Dependent Loss for Multiple Channels"; IEEE Photonics Technology Letters, vol. 14, No. 6; pp. 864-866, Jun. 2002.
Liu et al.; "Multichannel PMD mitigation through forward-error-correction with distributed fast PMD scrambling"; Optical Society of America; WE2; pp. 3, 2003.
Xie et al.; "Performance Degradation Induced by Polarization-Dependent Loss in Optical Fiber Transmission Systems With and Without Polarization-Mode Dispersion"; Journal of Lightwave Technology, vol. 21, No. 9; pp. 1953-1957, Sep. 2003.

* cited by examiner

*Primary Examiner* — Kenneth N Vanderpuye
*Assistant Examiner* — Merlin Brito Peguero
(74) *Attorney, Agent, or Firm* — Baker Botts L.L.P.

(57) ABSTRACT

A method is provided for reducing polarization dependent loss experienced by an optical signal comprises monitoring a power level of a polarization multiplexed optical signal. The method further comprises detecting a power spike based on the monitored power. The power spike is induced by misalignment of a polarization component axis of the optical signal with a polarization dependent loss (PDL) axis of one or more network elements. The method further comprises rotating the polarization orientation of the optical signal such that the power spike is reduced.

18 Claims, 6 Drawing Sheets

SYSTEM AND METHOD FOR REDUCING POLARIZATION DEPENDENT LOSS

TECHNICAL FIELD

The present disclosure relates generally to optical communication networks and, more particularly, to a method and system for reducing polarization dependent loss in an optical network.

BACKGROUND

Telecommunications systems, cable television systems and data communication networks use optical networks to rapidly convey large amounts of information between remote points. In an optical network, information is conveyed in the form of optical signals through optical fibers. Optical networks may also include various network elements such as amplifiers, dispersion compensators, multiplexer/demultiplexer filters, wavelength selective switches, couplers, etc. configured to perform various operations within the network.

However, each of these network elements may also introduce polarization dependent effects on the signals traveling through the network. These effects may cause the various components of the polarization states of the signals to experience varying degrees of loss or gain, thus causing unequal power levels of the various polarization components of the signals. This inequality of power may cause information or data carried by the signals to become distorted or lost.

SUMMARY

In accordance with the present disclosure, disadvantages and problems associated with polarization dependent loss may be reduced. In accordance with the present disclosure a method for reducing polarization dependent loss experienced by an optical signal comprises monitoring a power level of a polarization multiplexed optical signal. The method further comprises detecting a power spike based on the monitored power. The power spike is induced by misalignment of a polarization component axis of the optical signal with a polarization dependent loss (PDL) axis of one or more network elements. The method further comprises rotating the polarization orientation of the optical signal such that the power spike is reduced.

In accordance with another embodiment of the present disclosure a system for reducing polarization dependent loss experienced by an optical signal comprises a power monitor configured to monitor power of a polarization multiplexed optical signal. The system further comprises a polarization controller configured to rotate a polarization of the optical signal and a control unit coupled to the power monitor and polarization controller. The control unit is configured to determine a power spike based on the monitored power. The power spike is induced by misalignment of a polarization component axis of the signal with a polarization dependent loss (PDL) axis of one or more network elements. The control unit is further configured to control the polarization controller to rotate the polarization orientation of the signal such that the power spike is reduced.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
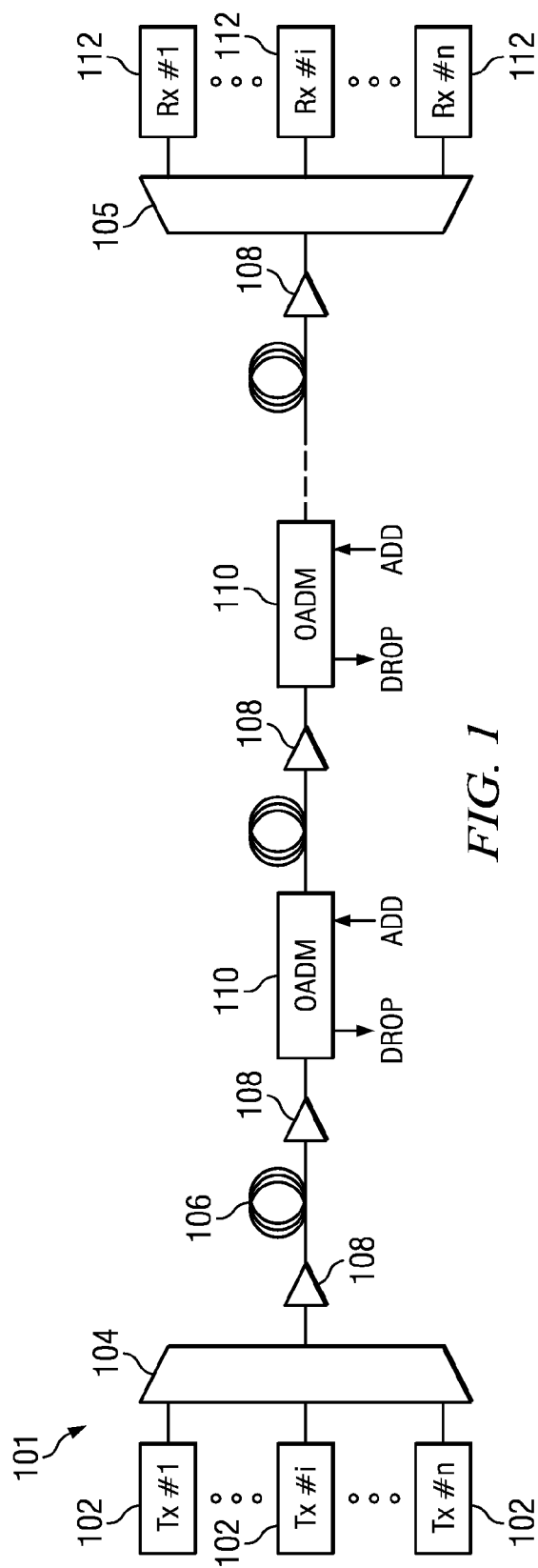
FIG. 1 illustrates an example embodiment of an optical network.

FIG. 1 illustrates an example embodiment of an optical network 101. Optical network 101 may include one or more optical fibers 106 configured to transport one or more optical signals communicated by components of optical network 101. The network elements of optical network 101, coupled together by fibers 106, may comprise one or more transmitters 102, one or more multiplexers (MUX) 104, one or more amplifiers 108, one or more optical add/drop multiplexers (OADM) 110, and one or more receivers 112.

Optical network 101 may comprise a point-to-point optical network with terminal nodes, a ring optical network, a mesh optical network, or any other suitable optical network or combination of optical networks. Optical fibers 106 comprise thin strands of glass capable of communicating the signals over long distances with very low loss. Optical fibers 106 may comprise any suitable type of fiber, such as a Single-Mode Fiber (SMF), Enhanced Large Effective Area Fiber (ELEAF), or a TrueWave® Reduced Slope (TW-RS) fiber.

Optical network 101 may include devices configured to transmit optical signals over fibers 106. Information may be transmitted and received through network 101 by modulation of one or more wavelengths of light to encode the information on the wavelength. In optical networking, a wavelength of light may also be referred to as a channel. Each channel may be configured to carry a certain amount of information through optical network 101.

To increase the information carrying capabilities of optical network 101, multiple signals transmitted at multiple channels may be combined into a single optical signal. The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in optical networks may be limited to the bit-rate of solely one wavelength. With more bandwidth, optical networks are capable of transmitting greater amounts of information. Optical network 101 may be configured to transmit disparate channels using WDM, DWDM, or some other suitable multi-channel multiplexing technique, and to amplify the multi-channel signal.

Optical network 101 may include one or more optical transmitters (Tx) 102 configured to transmit optical signals through optical network 101 in specific wavelengths or channels. Transmitters 102 may comprise any system, apparatus or device configured to convert an electrical signal into an optical signal and transmit the optical signal. For example, transmitters 102 may each comprise a laser and a modulator configured to receive electrical signals and modulate the information contained in the electrical signals onto a beam of light produced by the laser at a particular wavelength and transmit the beam carrying the signal throughout the network.

Multiplexer 104 may be coupled to transmitters 102 and may be any system, apparatus or device configured to combine the signals transmitted by transmitters 102, in individual wavelengths, into a single WDM or DWDM signal.

Amplifiers 108 may amplify the multi-channeled signals within network 101. Amplifiers 108 may be positioned before and/or after certain lengths of fiber 106. Amplifiers 108 may comprise any system, apparatus, or device configured to amplify signals. For example, amplifiers 108 may comprise an optical repeater that amplifies the optical signal. This amplification may be performed with opto-electrical or electro-optical conversion. In some embodiments, amplifiers 108 may comprise an optical fiber doped with a rare-earth element. When a signal passes through the fiber, external energy may be applied to excite the atoms of the doped portion of the optical fiber, which increases the intensity of the optical signal. As an example, Amplifiers 108 may comprise an erbium-doped fiber amplifier (EDFA). However, any other suitable amplifier, such as a semiconductor optical amplifier (SOA), may be used.

OADMs 110 may be coupled to network 101 via fibers 106 also. OADMs 110 comprise an add/drop module, which may include any system, apparatus or device configured to add and/or drop optical signals from fibers 106. After passing through an OADM 110, a signal may travel along fibers 106 directly to a destination, or the signal may be passed through one or more additional OADMs 110 before reaching a destination.

Network 101 may also include one or more demultiplexers 105 at one or more destinations of network 101. Demultiplexer 105 may comprise any system apparatus or device that may act as a demultiplexer by splitting a single WDM signal into its individual channels. In some embodiments, demultiplexer 105 may comprise a multiplexer 104 but configured to split WDM signals into their individual channels instead of combine individual channels into one WDM signal. For example, network 101 may transmit and carry a forty channel DWDM signal. Demultiplexer 105 may divide the single, forty channel DWDM signal into forty separate signals according to the forty different channels.

Network 101 may also include receivers 112 coupled to demultiplexer 105. Each receiver 112 may be configured to receive signals transmitted in a particular wavelength or channel, and process the signals for the information that they contain. Accordingly, network 101 may include at least one receiver 112 for every channel of the network.

Modifications, additions or omissions may be made to network 101 without departing from the scope of the disclosure. For example, network 101 may include more or fewer elements than those depicted. Additionally network 101 may include additional elements not expressly shown, such as a dispersion control module. Also, as mentioned above, although depicted as a point to point network, network 101 may comprise any suitable network for transmitting optical signals such as a ring or mesh network.

Figure 2A:
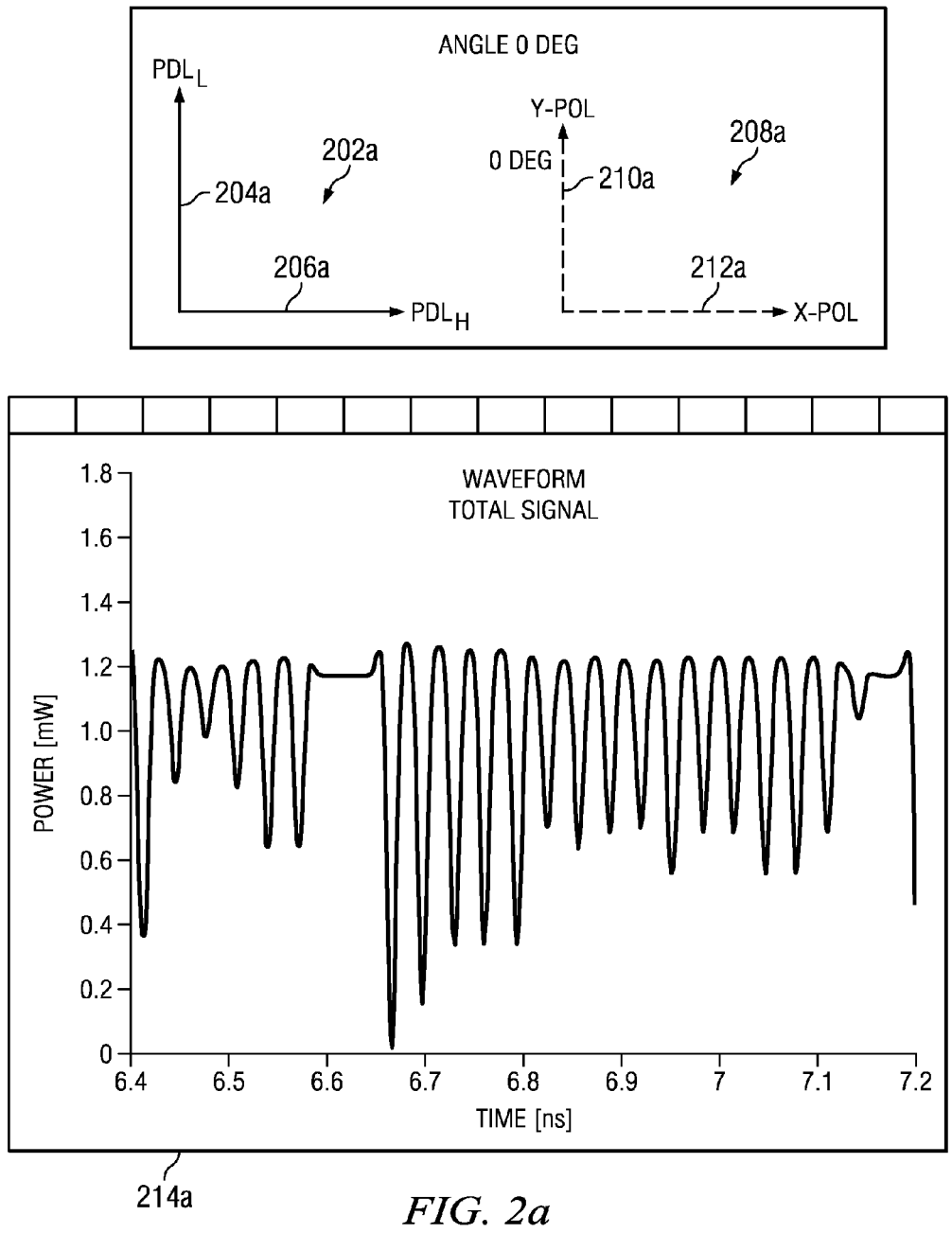
FIG. 2a illustrates the effects of PDL on signals with modulated polarization components substantially aligned with the high and low loss axes of PDL.
Figure 2B:
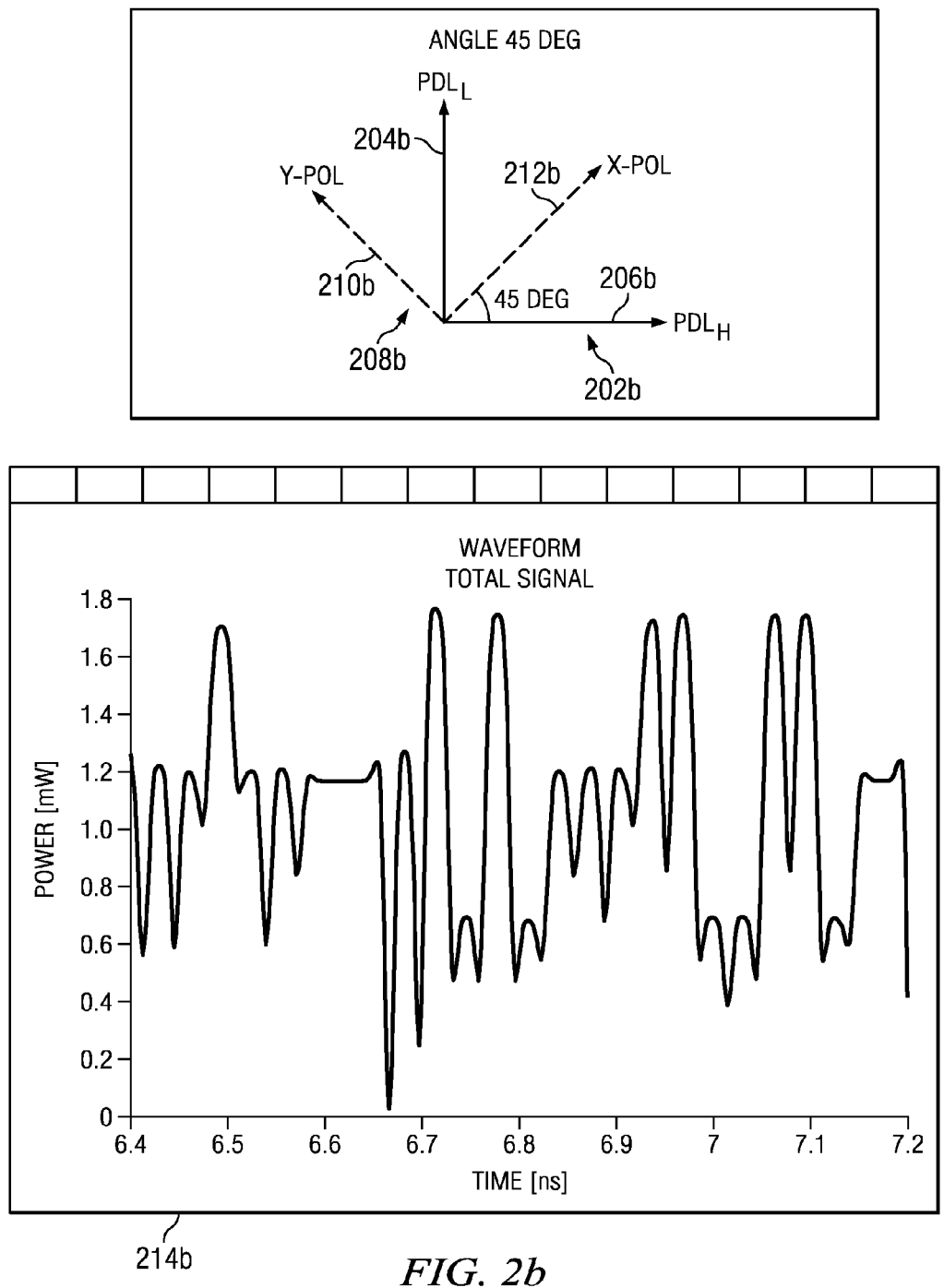
FIG. 2b illustrates the effects of PDL on signals with modulated polarization components oriented approximately forty-five degrees with respect to the high and low axes of the PDL.

FIGS. 2a and 2b illustrate the effects of polarization dependent loss on signals traveling through an optical network, such as network 101.

As discussed above, the amount of information that may be transmitted over an optical network may vary with the number of optical channels coded with information and multiplexed into one signal. Accordingly, an optical signal employing WDM may carry more information than an optical signal carrying information over solely one channel. An optical signal employing DWDM may carry even more information. Besides the number of channels carried, another factor that affects how much information can be transmitted over an optical network may be the bit rate of transmission. The greater the bit rate, the more information may be transmitted.

Polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal. The term "linear polarization" may generally refer to a single direction of the orientation of the electric field vector. Generally, an arbitrary linearly polarized wave can be resolved into two independent orthogonal components labeled x and y, which are in phase with each other. For example, in polarization multiplexed transmission, an optical beam created by a laser may be highly linearly polarized. The beam may be divided by a polarization beam splitter according to the x-polarization component of the beam and the y-polarization component of the beam. Upon being split, the x-polarization component may be aligned with a horizontal axis and the y-polarization component may be aligned with a vertical axis of the beam. It is understood that the terms "horizontal" polarization and "vertical" polarization are merely used to denote a frame of reference for descriptive purposes, and do not relate to any particular polarization orientation.

Following splitting of the beam into the x and y polarization components, information may be modulated onto both beams. Following modulation, both beams may be combined by a polarization beam combiner such that the combined beam comprises an optical signal with two polarization components (e.g., an x-polarization component and a y-polarization component) with information modulated onto each polarization component. Accordingly, by modulating information onto both the y-polarization component and x-polarization component of the signal, the amount of information that may be carried by the channel associated with the signal over any given time may increase (e.g., increasing the bit rate of the channel).

In the present disclosure, it is understood that as signals travel through the network, the polarization of the signals may rotate with respect to the frame of reference. Consequently, the modulated x and y polarizations may also be rotated such that the components are no longer aligned with the horizontal axis and the vertical axis of the frame of reference. However, the terms "x-polarization" and "y-polarization" of the signal may still be used to denote the polarization components with information modulated thereon even if the modulated x and y polarization components are no longer oriented with the horizontal and vertical axes of the frame of reference.

The various elements and devices in optical networks may affect the modulated x and y polarization components of each channel associated with the optical signals in different manners. Fibers 106, multiplexers 104, and add/drop modules 110 may attenuate signals as the signals pass through these elements and amplifiers 108 may amplify the signals. These elements may attenuate and amplify the various polarization components of each channel within the signals differently, thus causing a polarization dependent loss (PDL) and a polarization dependent gain (PDG).

For example, a multiplexer 104 may attenuate the modulated y-polarization of a wavelength associated with a channel greater than it may attenuate the modulated x-polarization of the same wavelength. Additionally, the modulated x and y polarizations of one wavelength associated with one channel may be affected differently than the x and y polarization of another wavelength associated with a different channel. Similarly, amplifiers 108 may amplify the modulated x and y polarization components of each channel associated with the optical signals differently. Accordingly, in a multi-polarization WDM signal, each modulated polarization component of each channel may experience varying degrees of gain and loss while passing through an optical network. Although the polarization dependent effects of the various network components may result from both PDL and PDG, the overall result of the effects may be referred to simply as PDL.

As mentioned above, these polarization dependent effects (e.g., PDL) may cause the different modulated polarization components of the polarization multiplexed signals to be amplified and attenuated at varying degrees, which may cause signal distortion and loss of information. The difference between the power of the modulated polarization component experiencing the most loss and the modulated polarization component experiencing the least loss may be a representation of the PDL of the signal as it passes through a network. The difference between the two indicates how the power of one polarization component has been affected by the various elements of the network compared to the power of the other polarization component, and thus may represent the PDL experienced by the signal. This difference may be represented in decibels (dB).

For example, in a dual-polarization signal, the modulated y-polarization may experience more loss than the modulated x-polarization, due to PDL, such that the signal power of the y-polarization is lower than the signal power of the x-polarization. The difference between the x-polarization and the y-polarization may represent the PDL experienced by the signal.

The PDL experienced by a signal depends on the PDL of the network or network element that the signal passes through. The PDL of the network or network elements may include a high loss axis and a low loss axis. The PDL of a network element may be associated with the maximum and minimum attenuation or amplification experienced by all the polarization components of an optical signal as the signal passes through a network element or device. The high loss axis of the PDL may be referred to as the orientation of the polarization that experiences maximum loss and the low loss axis may refer to the orientation of the polarization that experiences minimum loss.

For example, a network element may attenuate polarization components of optical signals aligned with the horizontal axis of a frame of reference of the optical signals the most and may attenuate polarization components of the optical signals aligned with the vertical axis of the frame of reference the least. Consequently, the high loss axis of the PDL of the network element may correspond with the horizontal axis of a frame of reference, and the low loss axis may correspond with the vertical axis of the frame of reference.

Polarization dependent effects experienced by each signal traveling through a network may also vary. Due to switching within networks, different signals may pass through different network elements that may create different polarization dependent effects. Additionally, environmental and physical factors such as bending and moving of fibers may also change the PDL of network elements such that the PDL experienced by signals traveling through a network may also change.

Signal degradation due to PDL may depend on the orientation between the high and low loss axes of the PDL and the signal polarization components modulated with information. FIG. 2a illustrates the effects of PDL on signals with modulated x and y polarization components substantially aligned with the high and low loss axes of PDL.

For example, in FIG. 2a, PDL 202a and a signal 208a are depicted. PDL 202a may represent the polarization dependent loss created by one or more network elements. PDL 202a may include a low loss axis 204a and a high loss axis 206a. Low loss axis 204a may be oriented such that the polarization component of signals oriented with the vertical axis of a frame of reference and passing through the network element associated with PDL 202a are attenuated or amplified the least. Consequently, low loss axis 204a may correspond with the vertical axis of the frame of reference. Additionally, high loss axis 206a may be oriented such that the polarization components of signals oriented with the horizontal axis and passing through the network element associated with PDL 202a are attenuated or amplified the most. Accordingly, high loss axis 206a may correspond with the horizontal axis of the frame of reference.

Signal 208a may include a y-polarization component 210a and an x-polarization component 212a. Polarization components 210a and 212a may each be modulated with information or traffic. Y-polarization component 210a may be oriented such that it is substantially aligned with low loss axis 204 and the vertical axis of the frame of reference. Additionally, x-polarization component 212a may be oriented such that it is substantially aligned with high loss axis 206a and the horizontal axis of the frame of reference.

Graph 214a depicts the average power of a signal, such as signal 208a, over time when y and x polarization components 210a and 212a are aligned with low and high loss axes 204a and 206a. As shown in graph 214a, when y and x polarization components 210a and 212a are approximately aligned with low and high loss axes 204a and 206a, the maximum power of signal 208a may be at a substantially constant level. Thus, the receivers receiving the signals may accurately process the information or data modulated onto the signals.

FIG. 2b illustrates the effects of PDL on signals with modulated polarization components oriented approximately forty-five degrees with respect to the high and low axes of the PDL. In FIG. 2b, PDL 202b may be substantially similar to PDL 202a depicted in FIG. 2a. Accordingly, PDL 202b may include low and high loss axes 204b and 206b that respectively correspond with the vertical and horizontal axes of the frame of reference.

Signal 208b may include modulated y-polarization component 210b and modulated x-polarization component 212b. Modulated y and x polarization components 210b and 212b may be oriented forty-five degrees between the horizontal and vertical axes. Accordingly, modulated polarization components 210b and 212b of signal 208b are oriented at forty-five degrees with respect to low and high loss axes 204b and 206b of PDL 202b—due to low and high loss axes 204b and 206b respectively corresponding with the vertical and horizontal axes of the frame of reference.

Graph 214b depicts the average power of a signal, such as signal 208b, over time when modulated polarization components 210b and 212b are oriented at forty-five degrees with respect to the high and low loss axes 206b and 204b of PDL 202b. When polarization components 210b and 212b are oriented at forty-five degrees with respect to high and low axes 206b and 204b, the PDL introduces large data dependent peak-to-peak optical power variations which may result in higher nonlinear phase noise generation. These nonlinear effects may greatly increase the optical signal to noise ratio (OSNR) penalty of signal 208b which may result in an inability to read the information modulated thereon. These large power variations due to the PDL effects may be seen in graph 214b with the many different spikes in maximum power of the signal.

Changes may be made to FIGS. 2a and 2b without departing from the scope of the present disclosure. For example, the orientations depicted are merely for illustrative purposes to depict the relative relationship between the orientations of high and low loss axes of PDL of a network element with respect to the polarization components of an optical signal.

Additionally, although the orientation of the modulated x and y polarization components of signals with respect to the high and low loss axes of the PDL has been described, simple reference to the orientation of signals with respect to PDL without mentioning the polarization components of the signals or the high and low loss axes of the PDL in the present disclosure may connote the same idea. Also, rotation of the polarization of a signal may be referred to simply as the rotation of the signal.

Figure 3:
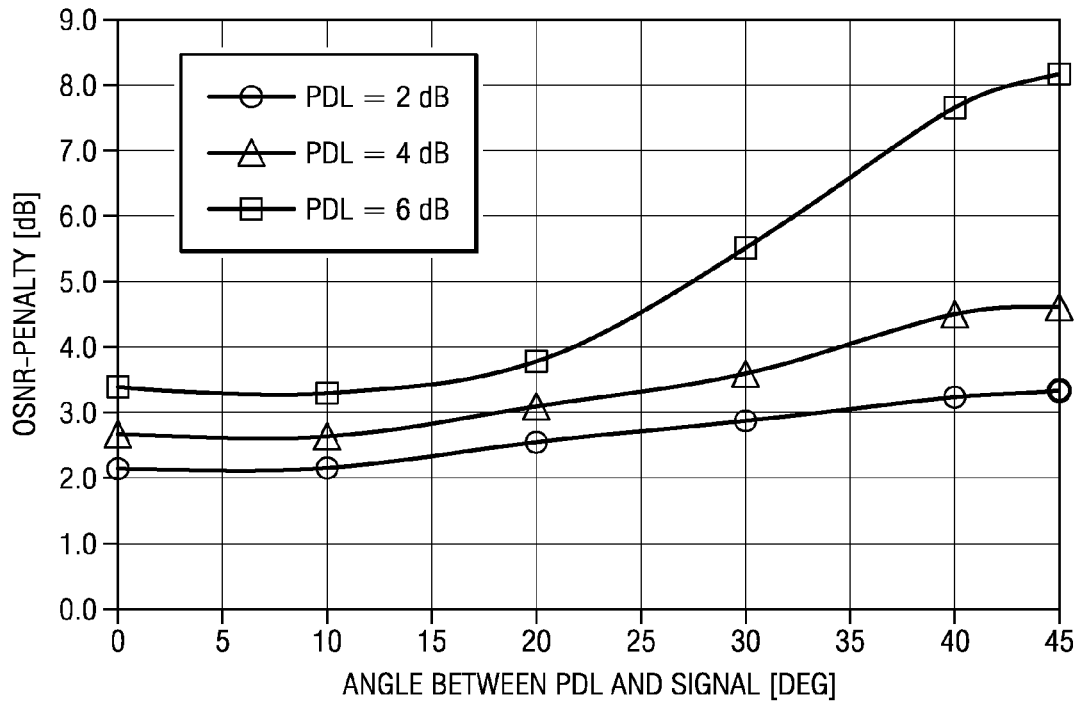
FIG. 3 illustrates the optical signal to noise ratio (OSNR) penalty of signals as the orientation angle between the signals and PDL changes.

FIG. 3 illustrates the OSNR penalty of signals as the orientation angle between the signals and the PDL axes changes. Additionally, FIG. 3 illustrates the difference in OSNR penalty according to varying magnitudes of PDL experienced by each signal. The orientation angle between the signals and the PDL may correspond with the alignment of the signals and PDL axes with respect to each other. For example, when the signals and PDL axes are substantially aligned, as depicted in FIG. 2a, the orientation angle between the two may approximately equal zero degrees. As the signals become less aligned with respect to the PDL axes, the orientation angle between the signals and the PDL axes increases. When the signals the most unaligned with the PDL axes, as depicted in FIG. 2b, the orientation angle between the signals and the PDL axes is forty-five degrees.

From the graph, it can be seen that the OSNR penalty increases as the angle of orientation associated with alignment between the PDL axes and the signal increases. In the present example, the OSNR penalty stays fairly level when the orientation angle is approximately between zero and fifteen degrees between the PDL axes and the signal, But, the OSNR penalty then dramatically increases as the orientation angle approaches forty-five degrees. Accordingly, it may be advantageous to detect when the orientation angle of the signal with respect to the PDL axes begins to affect the OSNR penalty and to appropriately reorient the signal to correct the problem.

Changes may be made to FIG. 3 without departing from the scope of the disclosure. For example, the values for the OSNR penalty, angle between the PDL axes and polarization components of the signal may vary. The specific values used in the present example are merely to depict the general trend of an increased OSNR penalty being associated with orientation of PDL axes with respect to optical signals.

Figure 4:
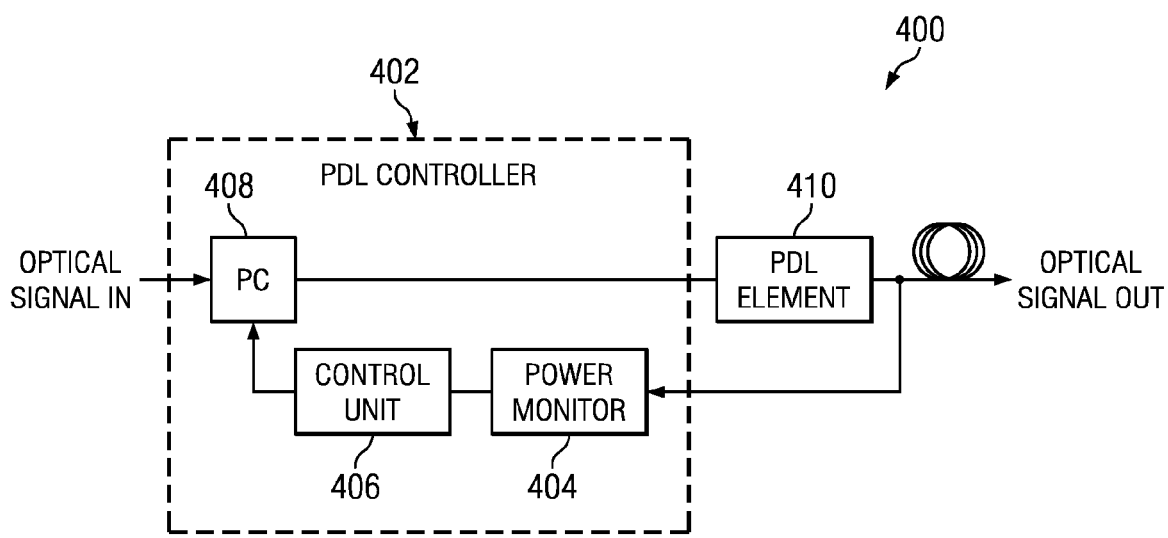
FIG. 4 illustrates an example system 400 configured to rotate a signal to reduce the nonlinear effects experienced by the signal and induced by the PDL due to the orientation of the signal with respect to the PDL.

FIG. 4 illustrates an example system 400 configured to rotate a signal to reduce the nonlinear effects experienced by the signal and induced by the PDL due to the orientation of the signal with respect to the PDL axes. System 400 may include one or more PDL controllers 402 that may include a power monitor 404, a control unit 406, and polarization controller 408.

System 400 may also include one or more PDL elements 410. PDL element 410 may comprise any system, apparatus, or device that may produce polarization dependent loss effects. For example, PDL element 410 may comprise an optical amplifier, a multiplexer or an add/drop module. PDL element 410 may include a high loss axis and a low loss axis wherein polarization components of signals oriented with the high loss axis experience the most loss and polarization components of the signals oriented with the low loss axis experience the least amount of loss.

PDL controller 402 may be any system, apparatus or device configured to determine when the orientation angle of signals with respect to the PDL axes of PDL element 410 results in negative effects that may cause signal degradation. Based on the orientation determination, PDL controller 402 may also be configured to rotate the polarization state of the signals such that the x and y polarization components are substantially aligned with the PDL axes of PDL element 410 to reduce or eliminate the nonlinear effects and reduce signal degradation.

PDL controller 402 may include power monitor 404. Power monitor 404 may comprise any system, apparatus or device configured to monitor or measure the power of an optical signal. Power monitor 404 may be coupled to the output of PDL element 410 such that power monitor 404 may be configured to measure the power of the signals leaving PDL element 410. Accordingly, power monitor 404 may be configured to detect power spikes associated with the orientation of the polarization components of the signals entering PDL element 410 not being substantially aligned with the PDL axes of PDL element 410. In some embodiments, power monitor 404 may be configured to monitor the power of the signals leaving PDL element 410 by measuring a small portion of the power, (e.g. 5%) of the signals exiting PDL element 410.

PDL controller 402 may also include control unit 406 coupled to power monitor 404. Control unit 406 may be any system, apparatus or device configured to determine whether power spikes associated with misalignment of the polarization components of the signals and the PDL axes of PDL element 410 occur based on the power monitored or measured by power monitor 404.

Control unit 406 may determine whether a power spike occurs by determining if the monitored power is a certain percentage above a baseline power level. In some embodiments, control unit 406 may determine the average power of signals leaving PDL element 410 detected and measured by power monitor 404. Control unit 406 may set the average power as the baseline power level. In such instances, control unit 406 may determine that a power spike has occurred if power monitor 404 detects a signal power that is a certain percentage above the average detected power. In alternative embodiments, the baseline power level may be set by a system or network administrator and control unit 406 may determine that a power spike has occurred if power monitor 404 detects a signal power that is a certain percentage above the appropriate power level set by a system or network administrator.

For example, in some embodiments, if power monitor 404 detects a power level that is 25% higher than the average power, control unit 406 may determine that a power spike associated with misalignment of the polarization components of the signals with the PDL axes has occurred. In this particular example, a power spike of 25% may correspond with an increase in the OSNR penalty of the signal of 0.5 dB. In this particular example, the power spike of 25% and OSNR penalty increase of 0.5 dB may correspond with the signal being oriented at an angle of approximately twenty degrees with respect to the PDL axes of PDL element 410.

The percentage increase in power that may result in control unit 406 determining that a power spike that needs correction has occurred may vary according to the particular characteristics and requirements of the system in which PDL controller 402 is implemented. In systems where the OSNR penalty may increase by higher than 0.5 dB, without adverse effects, control unit 406 may determine that a spike has occurred when the measured power level is higher than 25% over the average power. Conversely, in systems where an increase in the OSNR penalty by 0.5 dB is too high, control unit 406 may determine that a spike has occurred when the measured power level is less than 25% over the average power.

Control unit 406 may also be coupled to polarization controller 408 and may be configured to direct polarization controller 408 to rotate the polarization state of signals entering PDL element 410 such that the polarization components of the signals entering PDL element 410 may be more aligned with the PDL axes of PDL element 410. Control unit 406 may be configured to continue utilizing power monitor 404 after the rotation to determine if the rotation corrected the power spikes. If control unit 406 detects another power spike, control unit 406 may direct another rotation of the polarization state of the signal. Control unit 406 may be configured to continue rotating and monitoring signals until power spikes are reduced or eliminated. Accordingly the negative effects of misalignment, such as a higher OSNR penalty, may be reduced.

Control unit 406 may dictate varying degrees of rotation of the polarization state of signals entering PDL element 410 depending on the particular characteristics and requirements of the system in which PDL controller 402 is implemented. In some embodiments, control unit 406 may dictate that the rotations be in forty-five degree increments. In other embodiments, a rotational increment of forty-five degrees may be too large an increment to adequately correct the power spikes. Accordingly, in other embodiments, the amount of rotation may be less than forty-five degrees. In yet other embodiments, control unit 206 may be configured to first apply a rotational increment of forty-five degrees and if power spikes are detected within a certain amount of time after the forty-five degree rotation, a smaller rotational increment (e.g., twenty degrees) may be applied. In other embodiments, control unit 206 may direct even smaller incremental rotations (e.g., one or five degree increments) and may apply many rotations until reducing the power spikes.

In yet other embodiments PDL controller 402 may merely rotate the polarization state of a signal by a certain amount (e.g., forty-five degrees) and not have a feedback type of adjustment. In such embodiments, the OSNR penalty may be higher without signal degradation, the particular characteristics and requirements of the system or PDL controller 402 may not allow for feedback control, or any combination thereof may be present.

PDL controller 402 may be implemented in various locations of a network according to the amount of PDL created by each PDL element 410. A system may include a PDL controller 402 associated with every PDL element 410 included in the network if the PDL elements 410 each introduce a large amount of PDL. In other embodiments, a system may periodically include a PDL controller 402 if the PDL introduced by each PDL element 410 is smaller. In other instances, a system may include PDL elements 410 that have high PDL and may also include PDL elements 410 that have lower PDL. In such instances, the network may include a PDL controller 402 associated with each high PDL element 410 and may also include a single PDL controller 402 associated with a plurality of low PDL elements 410.

Although the PDL of PDL element 410 may not vary a lot, PDL controller 402 may be configured to monitor for power spikes and rotate the polarization state of the signals according to the power spikes on a continuous type basis. Although the PDL of the PDL element 410 may not vary a lot in a short amount of time, due to switching in the network, signals may enter PDL element 410 with varying polarization orientations. Thus, the alignment of the signals with respect to the PDL axes of PDL element 410 may vary on a regular basis and PDL controller 402 may be configured to monitor and adjust the PDL more often in situations such as this. In other embodiments where less switching occurs, PDL controller 402 may be configured to wait longer between monitoring and adjusting for PDL.

Modifications, additions or omissions may be made to system 400 without departing from the scope of the present disclosure. Although discreet components of PDL controller 402 are depicted, the functionality and operations performed by such components may be performed by a single component, or in other instances the operations and functionality of these components may be performed by more components than those depicted. For example, power monitor 404 and polarization controller 408 may each include a control unit, similar to control unit 406, configured to perform the operations of control unit 406 described with respect to each of them. Additionally, each discreet component depicted may include other components and may perform other operations than those explicitly described.

Further, power monitoring may be performed before a signal has entered an optical fiber after leaving a PDL inducing element. The power spikes may create larger interference once entering a fiber and, accordingly, it may be advantageous to monitor the power before the signal enters the fiber.

Figure 5:
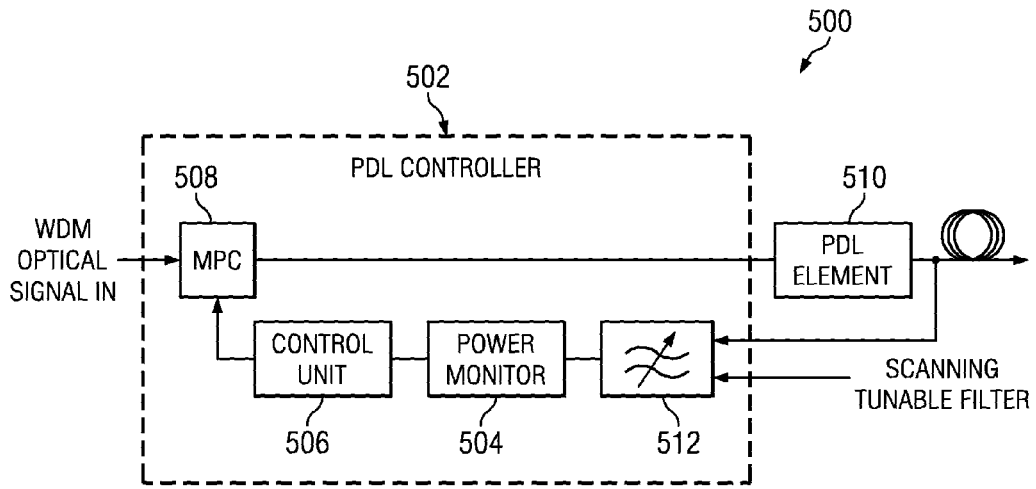
FIG. 5 illustrates an example system 500 configured to reduce the nonlinear effects induced by PDL on the channels of a WDM signal due to the orientation of the channels with respect to the PDL.

FIG. 5 illustrates an example system 500 configured to reduce the nonlinear effects induced by PDL on the channels of a WDM signal due to the orientation of the channels with respect to the PDL axes. As mentioned above, different channels or wavelengths are affected differently by the same PDL elements in a network and, therefore, to correct for the PDL of a WDM signal, the PDL experienced by each individual channel may need to be separately monitored and adjusted.

System 500 may include a PDL controller 502 similar to PDL controller 402 in system 400 described with respect to FIG. 4, except that PDL controller 502 may also include a scanning filter 512. System 500 may also include one or more PDL elements 510 substantially similar to PDL element 410 in system 400. In the present example, system 500 may be configured to carry WDM signals.

Power monitor 504 may be coupled to scanning filter 512 and may be substantially similar to power monitor 404. Accordingly, power monitor 504 may be configured to measure and monitor the power level of optical signals similarly to power monitor 404 measuring and monitoring the power level of optical signals as described with respect to FIG. 4.

Scanning filter 510 may be coupled to the output of PDL element 510 and also to power monitor 504 to allow power monitor 504 to detect or monitor the power level of each channel of the WDM signals. Scanning filter 510 may comprise any system, apparatus or device configured to sweep through a range of wavelengths and allow only a particular wavelength to pass while tuned to that wavelength. Accordingly, scanning filter 510 may be configured to sweep through the various channels of a WDM signal, such that power monitor 504 may monitor the power of that particular channel while filter 512 is tuned to that channel. Therefore, power monitor 504 may monitor the power of each individual channel as scanning filter 512 sweeps through each channel. The sweeping may allow power monitor 504 to detect whether a power spike has occurred at a particular channel due to that particular channel being misaligned with the PDL axes of PDL element 510.

Control unit 506 may be coupled to power monitor 504 and scanning filter 512. Control unit 506 may be substantially similar to control unit 406 described with respect to FIG. 4. Accordingly, control unit 506 may be configured to determine whether a power spike has occurred for each channel of a WDM signal similarly to how control unit 406 may determine whether a power spike has occurred for a single channel signal as described in FIG. 4. For example, control unit 506 may determine the average power for each channel and may determine if the measured power for that channel is above a certain percentage of the average power, which may correspond with a power spike.

Control unit 506 may also be configured to determine at which channel the power spike has occurred to direct polarization controller 508 which channel to rotate. Control unit 506 may be configured to determine at which channel the power spike has occurred by determining which channel scanning filter 512 was tuned to when the power spike was measured. In some embodiments, control unit 506 may be configured to direct the sweeping of scanning filter 512 such that control unit 506 may know the particular channel scanning filter 512 is tuned to at any particular time, and accordingly may determine if a power spike associated with that channel has been measured. In other embodiments, scanning filter 512 may communicate with control unit 506, the current channel that scanning filter 512 is tuned to.

Control unit 506 may be coupled to polarization controller 508. After determining which channel or wavelength has experienced a power spike, control unit 506 may be configured to direct polarization controller 508 to adjust the orientation of the polarization components of the particular channel or signal that has experienced the power spike.

Polarization controller 508 may comprise any system apparatus or device, such as a multi-wavelength polarization controller (MPC), configured to independently adjust the orientation of the polarization components of each individual wavelength or channel of a WDM signal. Therefore, polarization controller 508 may be configured to rotate polarization state of the individual channels of a WDM signal, as directed by control unit 506, such that the polarization of each channel may be properly aligned with the PDL axes of PDL element 510, even though the angle between each of the channels and the PDL axes may differ.

Below is an example of how PDL controller 502 may adjust the orientation of WDM signals to compensate for PDL. In the present example, before PDL controller has made any rotational adjustments, WDM signals entering PDL controller 502 and moving on to PDL element 510 may include a first channel that is oriented at forty-five degrees with respect to the PDL axes of PDL element 510. The WDM signals may also include a second channel that is aligned with the PDL axes of PDL element 510, and a third channel that is oriented at twenty degrees with respect to the PDL axes of PDL element 510.

Control unit 506 may be configured to determine that a power spike has occurred for any particular channel if the measured power is greater than twenty-five percent over the measured average power for that particular channel. A power spike of twenty-five percent may correspond with a channel being oriented at twenty degrees with respect to the PDL axes of PDL element 510. Additionally, the largest power spikes may occur when a signal is oriented at forty-five degrees with respect to the PDL axes of PDL element 510.

Scanning filter 512 may sweep through the individual channels of the WDM signal such that power monitor 504 monitors the power level of the first, second and third channels at individual times. Accordingly, while scanning filter 512 is tuned to the first channel, power monitor 504 and control unit 506 may detect and determine a power spike associated with the first channel, based on the first channel being at a forty-five degree angle with respect to the PDL axes of PDL element 510. Additionally, when scanning filter 512 is tuned to the second channel, power monitor 504 and control unit 506 may detect and determine no power spikes associated with the second channel, based on the second channel being aligned with the PDL axes of PDL element 510. Also, when scanning filter 512 is tuned to the third channel, power monitor 504 and control unit 506 may detect and determine a power spike associated with the third channel, based on the third channel being at a twenty degree angle with respect to the PDL axes of PDL element 512.

Based on the power spike determinations, control unit 506 may direct polarization controller 508 to rotate the polarization states of the first and third channels, but not of the second channel. In the present example, control unit 506 may be configured to direct polarization controller 508 to rotate the polarization states of the channels in twenty-degree increments. Accordingly, polarization controller 508 may rotate the first channel by twenty degrees such that the first channel is oriented at twenty-five degrees with respect to the PDL axes of PDL element 510 instead of being oriented forty-five degrees with respect to the PDL axes. Polarization controller 508 may not rotate the polarization state of the second channel because it may already be sufficiently aligned with the PDL axes. Additionally, polarization controller 508 may rotate the polarization state of the third channel by twenty degrees such that the third channel is aligned with the PDL axes of PDL element 510 instead of being oriented twenty degrees with respect to the PDL axes.

Therefore, when scanning filter 512 sweeps to the first channel after the rotational adjustment, power monitor 504 and control unit 506 may detect a power spike associate with the first channel based on the first channel now being oriented at twenty-five degrees with respect to the PDL axes of PDL element 510. The power spike may be smaller than when the first channel was oriented at forty-five degrees, but it may be present nonetheless. Additionally, when scanning filter 512 sweeps through the second and third channels after the rotational adjustment, power monitor 504 and control unit 506 may not detect any power spikes associated with those channels due to the second and third channels being sufficiently aligned with the PDL axes of PDL element 510.

Based on the second power spike determined for the first channel, control unit 506 may direct polarization controller 508 to rotate the first channel another twenty degrees. But, based on no power spike being determined for the second and third channels, control unit 506 may direct polarization controller 508 to continue not rotating the second channel and to maintain the rotation of the third channel by twenty degrees.

Consequently, polarization controller 508 may rotate the polarization state of the first channel by another twenty degrees, such that the first channel is now oriented at five degrees with respect to the PDL axes of PDL element 510 instead of the original forty-five degree and intermediate twenty-five degree orientation. Additionally, polarization controller 508 may not rotate the second channel and may maintain rotating the third channel by twenty degrees.

Thus, when scanning filter 512 tunes to the first channel, after the second rotational adjustment, power monitor 504 and control unit 506 may not detect and determine a power spike associated with the first channel. Even though the first channel may be five degrees off from being perfectly aligned with the PDL axes of PDL element 510, the first channel may be substantially aligned with the PDL axes of PDL element 510 that an increase in power greater than or equal to twenty-five percent, which may correspond with a power spike, may not occur.

Also, in the present example, assuming nothing has changed the alignment of the second and third channels, when scanning filter 512 tunes to the second and third channels, power monitor 504 and control unit 506 may not detect and determine a power spike associated with the second and third channels either. Therefore, PDL controller 502 and the components included in PDL controller 502 may be configured to individually measure and adjust each channel of a WDM signal to minimize the PDL experienced by each channel.

Modifications, additions or omissions may be made to system 500 without departing from the scope of the present disclosure. For example, PDL controller 502 may be configured to adjust each channel sequentially, or may be configured to adjust each channel at the same time. Furthermore, the percentage levels given to estimate a power spike, the number of channels and the angles associated with power spikes are for illustrative purposes. Other embodiments where these factors may vary from that described are still within the scope of the present disclosure.

Also, although PDL controller 502 is depicted with individual components performing specific functions, the functions of each component may be performed by more or fewer components without departing from the scope of the disclosure. For example, power monitor 504, scanning filter 512 and polarization controller 508 may each include a control unit, similar to control unit 506, that is configured to perform the operations associated with each respective component. In such an example, a separate, individual control unit 506, such as that depicted may be unnecessary.

Figure 6:
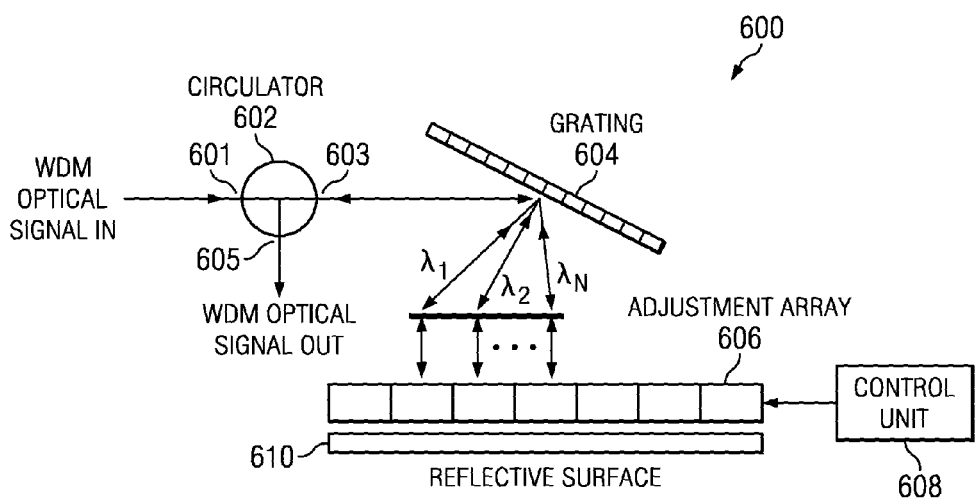
FIG. 6 illustrates an example of a multi-wavelength polarization controller.

FIG. 6 illustrates an example system 600 of a multi-wavelength polarization controller similar to polarization controller 508 described with respect to FIG. 5. System 600 may include a circulator 602, a grating 604, a polarization adjustment array 606, a control unit 608 and a reflective surface 610.

Circulator 602 may be any suitable system, apparatus or device configured to allow light to travel in only one direction through the circulator (e.g., clockwise, but not counter-clockwise). For example, a three port optical circulator may allow light to travel from port 1 to port 2, from port 2 to port 3 and from port 3 to port 1. In the present example, circulator 602 may include a port 601, a port 603 and a port 605. Circulator 602 may be configured to allow a signal to enter port 601 and exit 603. Circulator 602 may also be configured to allow a signal to enter port 603 and exit port 605. Accordingly, a WDM signal may enter the polarization controller and subsequently enter port 601 of circulator 602. Circulator 602 may direct the WDM signals that enter port 601 to exit port 603. The polarization controller may adjust the rotation of the WDM channels and direct the WDM signal back to port 603. Circulator 603 may direct the WDM signals entering port 603, from port 603 to port 605. At port 605, the WDM signals may exit the circulator and be directed to exit the polarization controller.

Grating 604 may be optically coupled to port 603 of circulator 602. Grating 604 may act as a de-multiplexer and may be any system, apparatus or device configured to split a WDM signal into its constituent channels that are included in the WDM signal. Grating 604 may also be configured to combine a plurality of wavelengths or channels into a single WDM signal. In the present example, after the WDM signals leave port 603, the polarization controller may direct the WDM signals to grating 604, such that grating 604 may split the WDM signals into each individual channel included in the WDM signal.

Grating 604 may be configured to direct the individual channels towards polarization adjustment array 606. Polarization adjustment array 606 may be optically coupled to grating 604 and may be any suitable system, apparatus or device configured to receive a plurality of optical wavelengths or channels and separately and independently adjust the orientation of the polarization state of each wavelength. Adjustment array 606 may be coupled to control unit 608, which may be any suitable system, apparatus or device configured to direct the rotation of each of the wavelengths by adjustment array 606. Control unit 608 may be configured to operate with respect to adjustment array 606 substantially similar to how control unit 506 may be configured to operate with respect to polarization controller 508 as described in FIG. 5. Additionally, although control unit 608 is depicted as part of system 600, which is described as a multi-wavelength polarization controller, control unit 608 may be a separate component from the polarization controller that may also perform other functions, such as depicted by control unit 506 in FIG. 5.

Consequently, adjustment array 606 coupled with control unit 608 may be configured to adjust the polarization state orientation of each channel of a WDM signal as directed by control unit 608. Consequently, each individual channel may be adjusted separately and independently. The adjustments may be based on power spikes of each channel determined by detecting increases in power over the average power for each channel, as described with respect to FIG. 5.

After leaving adjustment array 606, the individual channels of the original WDM signal may be directed to a reflective surface 610. Reflective surface 610 may comprise any suitable system, apparatus or device configured to reflect an optical signal. In some embodiments, reflective surface 610 may comprise a mirror.

Reflective surface 610 may be configured to direct the individual channels back towards grating 604. As mentioned above, in addition to being configured to divide a WDM signal into its individual channels, grating 604 may also be configured to combine individual channels into a single WDM signal. Accordingly, grating 604 may combine the rotationally adjusted channels directed from reflective surface 610 back into a WDM signal. Also, the channels within the newly combined WDM signal may each have been adjusted to reduce power spikes associated with each channel consequently the OSNR penalty associated with each channel and the entire WDM signal may be reduced.

Grating 604 may be configured to direct the newly combined and adjusted WDM signal back to port 603 of circulator 602. As mentioned above, circulator 602 may direct the newly combined and adjusted WDM signal to port 605, where the WDM signal may exit the polarization controller and continue through the network. Accordingly, system 600 may be configured to receive a WDM signal, de-multiplex the WDM signal into its individual channels, adjust the rotation of each channel according to the requirements of each channel, recombine the adjusted channels into a new WDM signal, and direct the new, adjusted WDM signal, back into an optical network.

Modifications, additions or omissions may be made to system 600 without departing from the scope of the present disclosure. For example, although depicted as having specific components that perform specific functions, system 600 may comprise any suitable system, apparatus or device configured to de-multiplex a WDM signal into its constituent channels and adjust the polarization of each individual channel. Additionally, in other embodiments, functions of system 600 may be performed by other network elements. For example, the function of grating 604 may be performed outside of the polarization controller and may be performed by a de-multiplexer.

Figure 7:
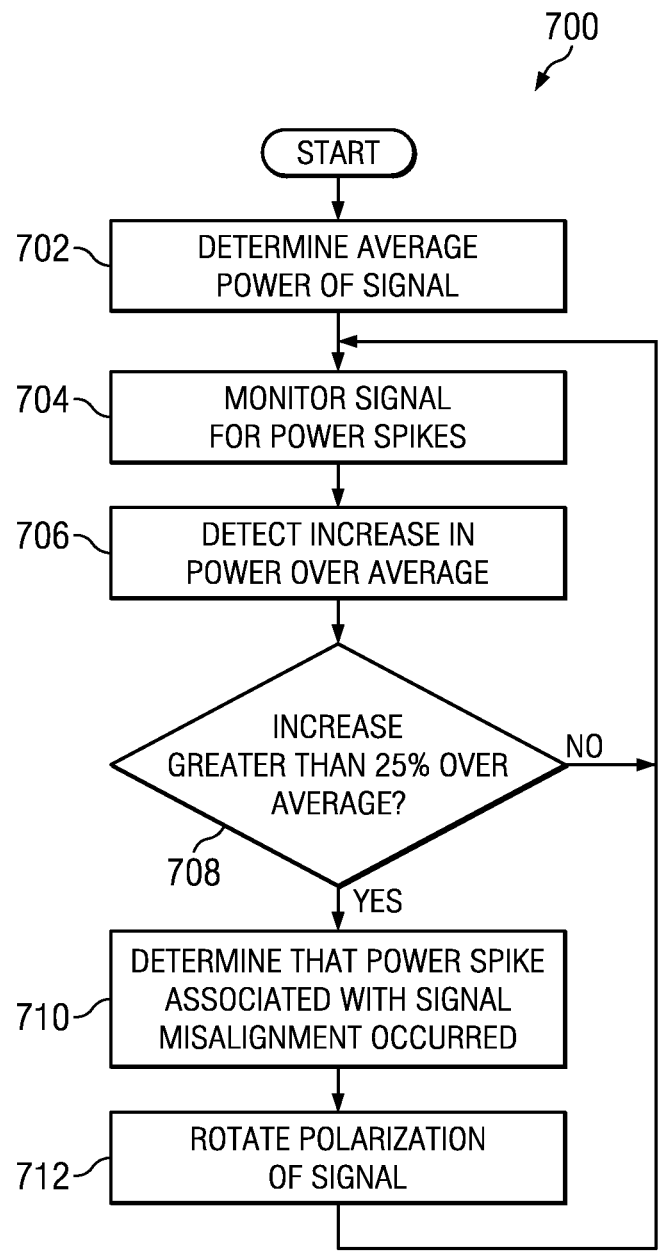
FIG. 7 illustrates an example method for reducing polarization dependent loss experienced by a signal.

FIG. 7 illustrates an example method 700 for reducing polarization dependent loss experienced by a signal. Method 700 may be performed by any suitable apparatus or device configured to perform the steps described such as PDL controller 402 or PDL controller 502 as described with respect to FIGS. 4 and 5 respectively.

Method 700 may start at step 702 where a PDL controller may determine an average power of an optical signal to determine a baseline power level of the signal. At step 704, the PDL controller may monitor the optical signal for power spikes. At step 706, the PDL controller may detect an increase in power over the average power.

At step 708, the PDL controller may determine whether the increase in power is greater than or equal to twenty-five percent over the average power level. If the increase in power is greater than or equal to twenty-five percent over the average power, method 700 may proceed to step 710. If the increase is not greater than or equal to twenty-five percent over the average power, the PDL controller may determine that a power spike associated with misalignment of the polarization components of the signal with respect to the PDL axes of a device or plurality of devices within a network has not occurred and method 700 may return to step 704 and may continue monitoring for power spikes.

At step 710, due to the increase in power of greater than or equal to twenty-five percent, the PDL controller may determine that a power spike occurred. The PDL controller may also determine that the power spike is associated with the polarization components of the signal being misaligned with the high and low loss axes of the PDL.

At step 712, the PDL controller may rotate the polarization state of the signal to better align the polarization components of the signal with the high and low loss axes of the PDL. Following step 712, method 700 may return to step 704 where the PDL controller may continue monitoring the signal for power spikes.

In some instances the rotation at step 712 may not be sufficient to adequately correct the misalignment, and the PDL controller may perform steps 704-712 again to compensate for the PDL of that and similarly affected signals, whereas in other instances the rotation may be sufficient.

Modifications, additions or omissions may be made to method 700 without departing from the scope of the present disclosure. For example, the PDL controller may determine that a power spike that needs correction has not occurred in instances where the increase in power is greater than twenty-five percent. In other instances, the PDL controller may determine that a power spike that needs correction has occurred in instances where the increase in power is less than twenty-five percent. Additionally, in yet other instances, the PDL controller may not determine the average power level and may determine that a power spike has occurred based on a baseline power level entered by an administrator instead of a baseline power level based on the average power.

Also, the functions performed at some steps may be performed with another step and essentially combined into the same step. Yet, in other embodiments, the functions described in a single step may be performed in a plurality of steps. For example, in some embodiments, steps 710 and 712 may be combined, and in other embodiments, step 710 may be divided into additional steps.

Although the present disclosure and its advantages have been described in detail, it should be understood that various changes, substitutions and alterations can be made herein without departing from the spirit and scope of the disclosure as defined by the following claims.

What is claimed is:

1. A method for reducing polarization dependent loss experienced by an optical signal comprising: monitoring a power level of a polarization division multiplexed optical signal after the optical signal leaves one or more polarization dependent loss (PDL) inducing components; detecting a power spike based on the monitored power, the power spike induced by misalignment of a polarization component of the optical signal with a PDL axis associated with the one or more PDL inducing components; and rotating the polarization orientation of the optical signal before the optical signal reaches the one or more PDL inducing components such that the power spike is reduced,
wherein detecting a power spike further comprises detecting at least a twenty-five percent increase in the monitored power level.

2. The method of claim 1, wherein rotating the polarization further comprises rotating the polarization until the power spike is reduced such that the monitored power is equal to a baseline power level.

3. The method of claim 1, wherein rotating the polarization further comprises rotating the polarization in increments.

4. The method of claim 1, wherein the signal comprises a wavelength division multiplexed (WDM) signal that comprises a plurality of channels, wherein the method further comprises:
monitoring a power level for each of the plurality of channels;
detecting whether a power spike has occurred for each of the plurality of channels based on the monitored power of each of the plurality of channels; and
rotating the polarization of each of the channels experiencing a power spike.

5. The method of claim 4, further comprising sweeping through each channel with a scanning filter to allow sequential power level monitoring of each channel.

6. The method of claim 1, wherein rotating the polarization further comprises rotating the polarization such that the polarization component axis of the signal is substantially aligned with the axis of the PDL to reduce the power spike.

7. The method of claim 1, wherein rotating the polarization further comprises rotating the polarization such that a polarization component axis of the signal is aligned with the axis of the PDL within a twenty degree angle to reduce the power spike.

8. The method of claim 1, wherein monitoring the power level further comprises monitoring the power before the signal enters an optical fiber.

9. The method of claim 1, further comprising determining an average power level of the signal based on the monitored power and wherein detecting a power spike further comprises detecting the power spike based on the average power.

10. A system for reducing polarization dependent loss experienced by an optical signal comprising: a power monitor configured to monitor power of a polarization division multiplexed optical signal after the optical signal leaves one or more polarization dependent loss (PDL) inducing components; a polarization controller configured to rotate a polarization of the optical signal before the optical signal reaches the one or more PDL inducing components; a control unit coupled to the power monitor and polarization controller and configured to: determine a power spike based on the monitored power, the power spike induced by misalignment of a polarization component axis of the signal with a PDL axis associated with the one or more PDL inducing components; and control the polarization controller to rotate the polarization orientation of the signal such that the power spike is reduced, wherein the control unit is further configured to detect a power spike based on at least a twenty-five percent increase in the monitored power level.

11. The system of claim 10, wherein the control unit is further configured to control the polarization controller to rotate the polarization orientation of the signal until the power spike is reduced such that the monitored power is equal to a baseline power level.

12. The system of claim 10, wherein the control unit is further configured to control the polarization rotator to rotate the polarization in increments.

13. The system of claim 10, wherein the signal comprises a wavelength division multiplexed (WDM) signal that comprises a plurality of channels;
wherein the power monitor is configured to monitor the power of each channel;
wherein the polarization controller further comprises:
a de-multiplexer configured to split the WDM signal into its constituent channels; and
a plurality of polarization controllers coupled to the de-multiplexer, each polarization controller configured to rotate the polarization of a different channel; and
wherein the control unit is further configured to determine a power spike and control rotation of the polarization with respect to each of the plurality of channels.

14. The system of claim 13 further comprising a scanning filter coupled to the power monitor and configured to sweep through each channel of the WDM signal to allow sequential power level monitoring of each channel.

15. The system of claim 10, wherein the control unit is further configured to control the rotation of the polarization such that the polarization component axis of the signal is substantially aligned with the axis of the PDL to reduce the power spike.

16. The system of claim 10, wherein the control unit is further configured to control the rotation of the polarization such that a polarization component axis of the signal is aligned with an axis of the PDL within a twenty-degree angle to reduce the power spike.

17. The system of claim 10, wherein the control unit is further configured to determine an average power level of the signal based on the monitored power and determine the power spike based on the average power level.

18. The system of claim 10, wherein the power monitor is further configured to monitor the power before the signal enters an optical fiber.

* * * * *